United States Patent [19]

Baile et al.

[11] 3,818,101

[45] June 18, 1974

[54] METHODS FOR IMPROVING THE FEED INTAKE OF MEAT PRODUCING ANIMALS

[75] Inventors: Clifton A. Baile, Glen Mills; Lavern F. Krabill, West Chester; C. Wayne Simpson, Malvern, all of Pa.

[73] Assignee: Smithkline Corporation, Philadelphia, Pa.

[22] Filed: Aug. 28, 1972

[21] Appl. No.: 284,374

[52] U.S. Cl................ 424/300, 424/321, 424/322, 424/324, 424/330
[51] Int. Cl............................................ A61k 27/00
[58] Field of Search .......... 424/330, 322, 321, 324, 424/300

[56] References Cited
OTHER PUBLICATIONS

Slangen et al. – Chem. Abst. Vol. 71 (1969) page 89890 b.

Antunes – Rodriques – Chem. Abst. Vol. 73 (1970) page 33781 r.

*Primary Examiner*—Sam Rosen
*Attorney, Agent, or Firm*—William H. Edgerton

[57] ABSTRACT

New methods and compositions for inducing polyphagia in immature, meat producing animals is described, utilizing $\beta$-adrenergic agonists or stimulants as active ingredients. The active ingredients are generally hydroxyphenethanolamines known to have sympathomimietic activity. Particularly useful are implant pellets due to the low doses of active ingredients at which polyphagic activity is found.

6 Claims, No Drawings

METHODS FOR IMPROVING THE FEED INTAKE OF MEAT PRODUCING ANIMALS

This invention relates to novel methods of inducing polyphagia in immature meat producing animals, such as pigs, sheep and especially cattle, and certain compositions useful in these new methods. More specifically, the novel methods of this invention comprise the internal preferably parenteral administration of a β-adrenergic stimulant (agonist) to the young, preferably ruminant, animal to stimulate the animal to continue eating past its normal level of satiety thereby causing the animal to gain weight at a faster rate than that of an untreated animal. Using this invention, the meat producing animal will reach the normal market weight faster with a saving of feed, lot or pen space and labor cost. Overall a better production efficiency and profit margin is realized by the feed lot industry by obtaining a lower feed and management cost per unit of marketable product.

Also included in this invention are compositions for administration to the growing animals which are subjects of these methods. The compositions are comprised mainly of three groups. First, and most preferably, the claimed compositions may be pellets which are implanted in the animal, preferably intramuscularly, thereafter allowing release of the active β-adrenergic agonist gradually over a period of from several days up to 6 months for prolonged polyphagia. This form of administration is convenient because of the very low effective doses of these active ingredients. Next, compositions comprising solutions or suspensions which can be injected into the subject animal, preferably intramuscularly. These first two compositions therefore comprise the active β-adrenergic stimulant plus conventional carriers in pharmaceutical forms well-known to the art. The active ingredient is present in a quantity which is sufficient to give a positive polyphagic effect but which does not have toxic side effects or acute systemic adrenergic effects. The third category of composition is a feed composition containing an effective polyphagic but nontoxic quantity of the β-adrenergic stimulant distributed throughout the feed carrier. Generally speaking the dose levels in feed compositions are higher on a per day basis than those administered by injection or implantation. All these compositions therefore comprise a veterinary carrier, pharmaceutical or feed stuff, combined with an effective, nontoxic quantity of a β-adrenergic stimulant or agonist dispersed therein.

The methods of this invention are carried out by administering the compositions described above to the immature meat producing animal internally by injection, implantation or addition to feed.

The basis of this invention is the unexpected discovery that in higher commercially important animals, e.g., ruminants, neural transmitters of the brain can make young animals continue to eat past their usual point of satiety. The polyphagic effects realized are found at extremely low concentrations of the active ingredient in the blood stream relative to those levels which the β-adrenergic agonists elicit frank or general pharmacological activity, e.g., bronchodilation or cardiovascular effects. The prior art shows that several groups of workers have found in other families of animals, especially in rodents and lower primates, that certain neural chemicals in the brain influence hunger or thirst [T. L. Yaksh et al., Am. J. Physiol., 222; 503 (1972)]. Also. S. F. Liebowitz [Proc. Nat. Acad. Sci., 67; 1063 (1970)]demonstrated that α-adrenergic agonists such as norepinephrine injected hypothalamically in rats enhance food intake in satiated rats. On the contrary, the β-agonist, or stimulant, is isoproterenol, suppressed the food intake of hungry rats. Also J. Antunes-Rodrigues et al. [Proc. Soc. Exp. Biol. Med., 133; 1464 (1970) ] demonstrated with rats that third ventricular injection of relatively large doses of both α or β stimulants (metaraminol or isoproterenol) stimulated food intake at 6 hours post injection but not at 1 hour, possibly indicating a gross biphasic reaction rather than a subtle positive effect of the neural transmitter. Conte [Pharmacologist, 10; 180 (1968)] showed that β-adrenergic stimulants peripherally administered (subcutaneously) to rats reduced food intake.

The present invention is based on the discovery that a certain subgroup of known sympathomimetic agents, e.g., β-adrenergic stimulants or agonists, have a polyphagic effect in commercial meat producing animals, contrary to the reports in the literature which assert that in some lower species only α-adrenergic agonists injected into the brain have a positive feeding effect. Also this effect has been found at low dose levels and by parenteral administration.

While parenteral administration is probably the most practical way for the animal industry to take advantage of this discovery, screening for activity is accomplished first by a cerebro-ventricular injection by methods to be described hereafter. We have also discovered that a specific chemical class of compounds have the ability to act as neural transmitters or neural enhancers when given parenterally, apparently because they are permeable to the blood-brain barrier. The compounds are generally β-adrenergic agonists or stimulants of the chemical group of phenethanolamines.

More specifically the compounds are hydroxyphenethanolamines having the following general structural formula:

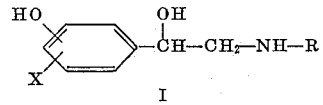

in which:
R is a lower branched or unbranched alkyl of from 1–8 carbon atoms, a cycloalkyl of from 3–6 carbon atoms, an aralkyl of from 5–12 preferably 7–9 carbon atoms or, when taken with the methylene carbon alpha to the nitrogen atoms, a saturated five or six membered hetero ring, such as piperidyl or pyrrolidyl ring; and X is two or preferably one hydroxy, alkyl of 1–10 preferably 3–6 carbon atoms, halo such as chloro or bromo, hydroxymethyl, lower alkoxymethyl, sulfamyl, N,N-dimethylsulfamido, ureido, carboxy, acetamido, formamido, amino, ureidomethyl, lower alkylamino, lower alkylsulfonylmethyl, carbomethoxyamino and carbethoxyamino, said lower alkyl or lower alkoxy having 1–8 carbon atoms, preferably 1–2 carbon atoms.

The compounds of Formula I which have β-adrenergic stimulant activity are candidates for use as the active ingredients of the claimed methods and compositions. To determine whether such compounds have the desired β-agonist activity any standard in vitro test for adrenergic stimulant activity such as spontaneous guinea pig tracheal tone relaxation may be primarily used followed by tests of the active ingredients administered by intraventricular injection in the target animal, most usually cattle or sheep.

TRACHEAL CHAIN TEST

Guinea pig tracheal chains are suspended in Krebsbicarbonate solution in a tissue bath, bubbled with a mixture of 95% $O_2$, 5% $CO_2$ and maintained at 37.5°C. and pH of 7.3. Isotonic relaxations of the tracheal chains produced by cumulative dosing are recorded via a linear motion transducer, with tissue tension at 250 mg. Responses are expressed as a percent of the maximum possible relaxation for such tissue obtained by the addition of 10 mcg./ml. papaverine to the bath at the end of each experiment. One compound is tested per tissue, with the cumulative addition of a number of doses of the compound. Usually up to six tissues may be used to obtain a cumulative dose range response curve. Significant activity is defined as a relaxation of the spontaneous tracheal tone which is at least 25% of the maximum possible response. The $ED_{50}$ is defined as the dose producing 50% of the maximum possible relaxation. $ED_{50}$'s are read from the cumulative dose response curves drawn for each tissue. Means are obtained by averaging the $ED_{50}$ values for each tissue. The following data represents either phase one (one tissue) or phase two (pooling of tissues) data and is only intended to give a qualitative indication of β-adrenergic stimulant activity:

| X | OH | R | $ED_{50}$ mcg./ml. |
|---|----|---|-------------------|
| 3-OH | 4 | -CH(CH$_3$)$_2$ | 0.0015 |
| 2-Cl,3-OH | 4 | CH(CH$_3$)$_2$ | 0.00074 |
| 2-Cl,3-OH | 4 | C$_5$H$_9$(cyc.) | 0029 |
| 5-Cl,5-OH | 4 | CH(CH$_3$)$_2$ | .058 |
| 2-Cl,4-OCH$_3$ | 2 | C$_5$H$_9$(cyc.) | .058 |
| 3-Cl,5-OCH$_3$ | 4 | CH(CH$_3$)$_2$ | 0.7 |
| 3-CH$_2$OH | 4 | C(CH$_3$)$_2$ | 0024 |
| 3-NH$_2$ | 4 | CH(CH$_3$)$_2$ | .011 |
| 3-NHCONH$_2$ | 4 | C(CH$_3$)$_3$ | .004 |
| 3-NHCO$_2$C$_2$H$_5$ | 4 | C(CH$_3$)$_3$ | 0148 |
| 3-NHCO$_2$CH$_3$ | 4 | C(CH$_3$)$_3$ | 0094 |
| 3-OCH$_3$ | 4 | CH(CH$_3$)$_2$ | 0.81 |
| 3-NHCONHCH$_3$ | 4 | C(CH$_3$)$_3$ | .037 |
| 3-CO$_2$H | 4 | C(CH$_3$)$_3$ | 0.46 |
| 3-NHCOCH$_3$ | 4 | C(CH$_3$)$_3$ | .014 |
| 3-NHCHO | 4 | C(CH$_3$)$_3$ | 0.00029 |
| 3-NHCO$_2$N(CH$_3$)$_2$ | 4 | C(CH$_3$)$_3$ | 0159 |
| 3-NH$_2$ | 4 | C(CH$_3$)$_3$ | 0073 |
| 3-NHCOCH$_3$ CH$_3$ | 4 | | 1.45 |
| 3-CH$_2$NHCONH$_2$ | 4 | C(CH$_3$)$_2$ | .018 |
| 3-CH$_2$SO$_2$CH$_3$ | 4 | C(CH$_3$)$_2$ | 0052 |
| 3-N(CH$_3$)$_2$ | 4 | C(CH$_3$)$_2$ | 0098 |
| H (α-CH$_3$) | 4 | C$_3$H$_9$ | 0.54 |
| H | 3 | CHCH$_3$CH$_2$C$_6$H$_4$OH | 0.00092 |
| H | 3 | cond. piperidyl | 0.42 |
| 3-NHCONH$_2$ | 4 | cond. piperidyl | 3.45 |
| 3-CH$_2$SO$_2$CH$_3$ | 4 | cond. piperidyl | 1.38 |
| 3-OH | 4 | cond. piperidyl erythro | 0.0045 |
|  |  | threo | 0.43 |
| 3-OH | 5 | cond. piperidyl | 0.1 |
| 2-CH$_3$-3-OCH$_3$ | 4 | cond. piperidyl | 0.44 |
| 3-OH-6-Cl | 4 | cond. piperidyl | 1.13 |
| 2-CH$_3$-3-OH | 4 | cond. piperidyl | 0.003 |
| 3-OH | 4 | cond. piperidyl | 0.0045 |
| 3-NH$_2$ | 4 | cond. piperidyl | 0.098 |
| 3-CH$_2$OH | 4 | cond. piperidyl | 0.125 |
| 3-NHSO$_2$CH$_3$ | 4 | cond. piperidyl | 0.0073 |
| 1,2,3,4-tetrahydro-1-(3,4,5-trimethoxybenzyl)-6,7-isoquinolinediol | | | 0.00029 |
| 6,7-dihydroxy-1-isopropyl-1,2,3,4-tetrahydroisoquinoline | | | 0.032 |
| 8-hydroxy-α[(isopropylamino)-methyl]-5-quinolinemethanol | | | 0.0158 |

Effects on feeding by intraventricular injection in sheep and cattle were carried out using methods reported by the inventors in Federated Proceedings, 31, 397 Abs. (1972); 31, 290 Abs. (1972) at the Middle Atlantic Regional Meeting of the American Chemical Society, February 14-17, 1972 and in Life Sciences, 11; 661, (1972).

SUMMARY OF VENTRICULAR INJECTIONS

Sheep

| Chemical | n | Dose (n moles) | Percent of control intake after— | | |
|----------|---|----------------|---------|---------|----------|
|          |   |                | 30 min. | 60 min. | 120 min. |
| A | 8 | 6.25 | 42 | [1] 132 | [1] 260 |
|   | 8 | 12.5 | 25 | [1] 120 | 177 |
|   | 8 | 25 | 33 | 85 | 130 |
|   | 8 | 50 | 27 | 75 | 120 |
| B | 7 | 12.5 | 10 | 40 | 76 |
|   | 5 | 25 | 41 | [1] 110 | 172 |
|   | 8 | 50 | 31 | [1] 106 | 136 |
| C | 8 | [2] 6.7 | 104 | 104 | |
|   | 8 | [2] 13 | [1] 242 | [1] 271 | |
|   | 8 | [2] 26 | [1] 170 | 202 | |
|   | 8 | [2] 77 | [1] 246 | [1] 260 | |

Cattle

| Chemical | n | Dose (n moles) | Percent of control intake after— | | |
|---|---|---|---|---|---|
| | | | 30 min. | 60 min. | 120 min. |
| A | 8 | 250 | 46 | 66 | 81 |
| | | 500 | 87 | [1] 131 | 153 |
| | | 1,000 | 75 | 156 | 191 |
| | 8 | 2,000 | 59 | 83 | 99 |
| | 8 | 4,000 | 97 | [1] 159 | [1] 193 |
| | 8 | 8,000 | [1] 189 | [3] 245 | [3] 259 |
| B | 8 | 1,000 | 117 | 143 | 217 |
| | 8 | 2,000 | 44 | 70 | 75 |
| | 8 | 4,000 | 80 | 150 | [1] 204 |
| | 8 | 8,000 | 90 | [1] 186 | [3] 222 |
| C | 8 | 1,000 | 64 | [1] 151 | [1] 201 |
| | 8 | 2,000 | 124 | 153 | 196 |
| | 8 | 4,000 | [3] 23 | 44 | 97 |
| | 8 | 8,000 | 49 | 108 | 118 |

[1] Significantly different from control, p<.05.
[2] Micrograms.
[3] Significantly different from control, p<.01.

NOTE.—See the following:

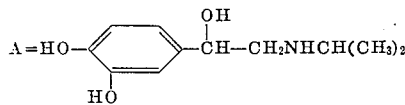

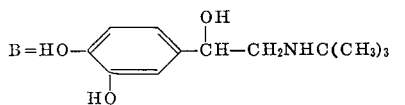

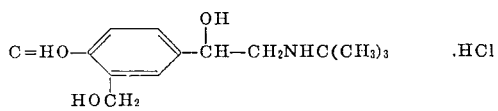

Particularly preferred active ingredients of the claimed methods and compositions are those of the following structural formula:

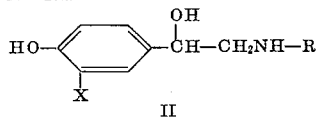

in which:

R is tert.butyl, isopropyl or, when taken with the adjacent carbon atom, piperidyl, and X is hydroxymethyl, methoxymethyl, ureidomethyl, N-methylureidomethyl, N,N-dimethylureidomethyl, methylsulfonylmethyl, preferably in the 3- position.

An advantageous species in the compound of Formula II in which R is tert.butyl and X is 3-hydroxymethyl plus its pharmaceutically acceptable salts with nontoxic acids.

PERIPHERAL (I.V.) INJECTIONS IN SHEEP AND CATTLE

The active ingredient was tested in 24 sheep or 32 cattle weighing 50–60 and 200–300 kg., respectively. Feed and water were available ad libitum.

A control of dimethylsulfoxide (DMS) was maintained. The procedure comprised; 60 min. weigh feed, 0 min. inject chemical in 1.5 ml. DMS for sheep and 5.0 ml. for cattle intravenously then weigh feed, +30 min. weigh feed, +60 min. weigh feed and +120 min. weigh feed.

SUMMARY OF I.V. INJECTIONS

Cattle

| Chemical | n | Dose (n moles) | Percent of control intake after— | | |
|---|---|---|---|---|---|
| | | | 30 min. | 60 min. | 120 min. |
| A | 8 | 312.5 | 26 | [1] 67 | 100 |
| | 8 | 5,000 | 4 | 18 | 40 |
| | 8 | 10,000 | 2 | 44 | 68 |
| B | 8 | 156.3 | 11 | 60 | 124 |
| | 8 | 312.5 | 16 | [2] 118 | [2] 229 |
| | 8 | 625 | 34 | [1] 97 | [1] 195 |
| | 8 | 1,250 | [1] 78 | [2] 147 | [2] 247 |
| | 8 | 2,500 | 53 | [2] 144 | [2] 291 |
| | 8 | 5,000 | 25 | [2] 125 | [1] 166 |
| | 8 | 10,000 | 9 | 56 | 113 |
| C | 7 | 62.5 | 14 | 56 | 136 |
| | 7 | 125 | 6 | [1] 86 | [2] 189 |
| | 7 | 250 | 22 | 56 | [2] 203 |
| | 7 | 500 | 30 | 88 | 119 |
| D | 8 | 156.25 | 32 | [2] 104 | 138 |
| | 8 | 312.5 | 19 | 60 | 77 |
| | 8 | 625 | 9 | [2] 111 | [2] 189 |
| | 8 | 625 | [1] 59 | [2] 129 | [2] 195 |
| E | 8 | 75 | 13 | 37 | 170 |
| | 7 | 112.5 | 11 | 80 | 154 |
| | 7 | 150 | 11 | 59 | [1] 220 |
| | 7 | 225 | [2] 59 | [1] 104 | [2] 233 |
| | 7 | 300 | 26 | [1] 107 | 167 |
| Sheep | | | | | |
| A | 8 | 250 | 81 | 92 | 99 |
| | 8 | 500 | 73 | 75 | 76 |
| | 8 | 750 | [1] 111 | 123 | 137 |
| | 8 | 1,000 | [2] 119 | [2] 138 | [1] 157 |
| | 8 | 1,500 | [2] 112 | [1] 113 | [1] 163 |
| | 8 | 2,000 | 85 | 95 | 133 |
| | 8 | 3,000 | 42 | 69 | 81 |
| F. 673 | | | | | |
| B | 8 | 62.5 | 68 | 69 | 69 |
| | 8 | 125 | [2] 106 | [1] 121 | 127 |
| | 8 | 250 | [1] 82 | 101 | [2] 157 |
| | 8 | 500 | [1] 98 | 110 | 133 |
| | 7 | 1,000 | 69 | 80 | 81 |
| | 8 | 2,000 | 38 | 45 | 65 |
| | 8 | 4,000 | 57 | 57 | 68 |
| C | 9 | 62.5 | 77 | 90 | 111 |
| | 9 | 93.35 | [1] 5 | 65 | 126 |
| | 9 | 125 | 68 | 74 | [2] 154 |
| | 9 | 187.5 | 36 | 55 | 112 |
| | 9 | 250 | 33 | 46 | 82 |
| D | 7 | 16.75 | 65 | 90 | 113 |
| | 13 | 31.25 | [2] 139 | [2] 141 | [2] 151 |
| | 8 | 24 | 79 | 87 | 93 |
| | 8 | 48 | 83 | 84 | 101 |
| | 7 | 62.5 | 43 | 44 | [2] 52 |
| | 7 | 250 | 44 | 49 | [2] 53 |

[1] Significantly different from control, p<.05.
[2] Significantly different from control, p<.01.

Note.—See the following:

A = HO—⟨C₆H₃(OH)⟩—CH(OH)—CH₂NHCH(CH₃)₂ · HCl

B = HO—⟨C₆H₃(CH₂OH)⟩—CH(OH)—CH₂NHC(CH₃)₃ · HCl

C = HO—⟨C₆H₃(CH₃SO₂NH)⟩—CH(OH)—piperidyl · ½H₂SO₄

D = ⟨C₆H₃(CH₃SO₂NH)⟩—CH(OH)—CH₂NH—CHCH₃CH₂—⟨C₆H₄⟩—OH

E = HO—⟨tetrahydroisoquinoline⟩—NH—CH(CH₃)₂ · HBr

The active ingredients of this invention are either old compounds known to the art or are easily prepared by synthetic methods readily apparent to the medicinal chemist familiar with that art. For examples of the preparation of these compounds reference may be made to copending applications, Ser. Nos. 2,660; 204,718; 236,177; 137,064; 148,912; 118,156: U.S. Pat. Nos. 3,655,676; 3,655,896; 3,497,516: Belgian Pat. Nos. 725,474; 751,190; 742,604; 751,190: South African Pat. No. 67/5591, or J. Med. Chem., 13, 1057 (1970); 10, 462 (1967).

Generally speaking however the secondary amines of Formula I are prepared from the optionally substituted benzyloxyphenones by $\alpha$-bromination then reaction of the $\alpha$-bromo derivative with an N-benzyl secondary amine followed by removal of the protective benzyl moiety, such as by catalytic hydrogenation which also reduces the keto group. The condensed piperidyl compounds of Formula I are generally prepared by condensation of the optionally substituted ether derivative of a hydroxybenzaldehyde with a 2-pyridyl lithium followed by removal of the ether groups and reduction of the pyridyl moiety.

Alternatively, known quinoline, tetrahydroisoquinoline or isoquinoline adrenergic agonists or sympathomimetic agents, such as those in U.S. Pat. No. 3,655,896 or 3,497,516, may be used. These are related to the sympathomimetic amines of Formula I above, as are the condensed piperidyl congeners, since in effect they also have a self-condensed structure. The isoquinolines, for example, are joined through the $\alpha$ carbon atom of the N-alkyl group to the $\alpha$ position of the phenyl ring. The piperidyl congeners, on the other hand, are joined by the nitrogen atom of the amine group to the methylene $\alpha$ to the carbinol moiety. Therefore, the equivalence of the isoquinolines and the piperidines to the compounds of Formula I is obvious to the medicinal chemist skilled in this art.

Since the active ingredients are bases, they may be equivalently used as their nontoxic acid addition salts with pharmaceutically acceptable acids which are also made by standard methods of preparing salts such as reacting the base in organic solvent such as ether or benzene with an excess of the desired acid. Exemplary salts are prepared from acetic, sulfuric, hydrochloric, hydrobromic, sulfamic, methanesulfonic, p-toluenesulfonic, pamoic, resin, nitric, phosphoric, lactic and similar acids. Water soluble salt forms are particularly useful for injectable or implant compositions. These include particularly the salts with common mineral acids.

This invention also includes the individual isomers of the racemic compounds whenever an asymmetric carbon atom is present. Such isomers are isolated by standard chemical techniques.

The active compounds of Formulas I or II can be administered to the immature animals internally, i.e., either intramuscularly or subcutaneously in the form of sterile veterinary solutions or suspensions for injection or preferably as veterinary pellet implants, or less advantageously the compounds can be dispersed throughout conventional animal feed compositions. The feed compositions are then fed to immature preferably ruminant animals, according to methods well-known to the agricultural art. The compounds are particularly advantageous when incorporated into implants. The amount of the active ingredient in the composition will be a quantity of the $\beta$-adrenergic stimulant sufficient to induce polyphagia in the satiated immature animal but not be overtly toxic or pharmacodynamic in the animal.

The animal feeds most generally used in conjunction with the method of this invention are either various grain mixtures and/or roughage feeds such as hay commonly fed to growing ruminant animals such as cattle or sheep. The amount of additive used to supplement such feeds will be in an amount sufficient to increase feed intake and/or improve the feed efficiency of the animal but not to have a toxic or noxious effect; in the broad range of from about 2.5 mg. to 25 g. per ton of feed, preferably from about 0.1 g. to about 1.5 g. per ton. An average sheep will ingest about 3–4 lbs. of feed daily; an average feed lot steer about 20–25 lbs. The preferable broad range of dosage for ruminants by parenteral administration is approximately 2.5 ug. to 25 mg. per day. In the preferred implants, the dose per day is from about 2.5 ug. to 25 mg., preferably from about 25 ug. to 2.5 mg.

Generally the methods of this invention using parenteral administration comprise injecting, subcutaneously, intramuscularly intravenously a polyphagic but nontoxic amount of the active ingredient such as the daily dosage quantities mentioned which are based on the activity of the most preferred compound. Administration may be usually at most once a day but may be varied as polyphagia is desired. Usually the treatment may take place every several days, weeks or even months. The preferred implant forms of the invention might be used only one to three or four times in the growing time of the animal. They might be administered in the ear or hind quarter of the animal.

For commercial use, the active ingredients when used in the feed can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 1–75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil, and cottonseed oil; antioxicants, minerals, vitamins, antibiotics, anthelmintics; and other appropriate medicaments.

Examples of typical prepared animal feed is as follows:

EXAMPLE 1

| Ingredients | Weight per cent |
|---|---|
| Mixed hay | 40.0 |
| Ground yellow corn | 45.0 |
| Soybean oil meal | 7.0 |
| Cane molasses | 7.0 |
| Dicalcium phosphate | 0.5 |
| Trace minerals salt | .5 |
| Vitamin A | 300 I.U./lb. |
| Vitamin D | 150 I.U./lb. |
| $\alpha$[(tert.butylamino)methyl]-4-hydroxy-m-xylene-$\alpha^1$, $\alpha^3$-diol (salbutamol) | 50 P.P.B. or 25 ug./lb. |

The method of this invention using feed compositions comprises allowing the growing animal to graze or be fed ad libitum on the supplemented rations or to be fed on a regular schedule.

EXAMPLE 2

| Ingredients | Weight per cent |
|---|---|
| α[(tert.butylamino)methyl]-4-hydroxy-m-xylene-α¹,α³-diol sulfate | 100 P.P.B. or 50 ug./lb. |
| Calcium sulfate, dihydrate | 20 mg. |
| Gelatin | 4 mg. |
| Magnesium stearate | 1 mg. |
| Talc | 2 mg. |

The sulfamide and calcium sulfate, dihydrate are mixed and passed through a No. 40 standard mesh screen. The screened mixture is then granulated with hot 15% gelatin solution, screened through a No. 10 mesh screen and dried overnight at 120°F. The granules are again screened through a No. 40 mesh screen and mixed with the magnesium stearate and talc. The granules are compressed into implants using a ⅛" flat face punch and die. One implant is administered intramuscularly. Other standard methods of preparing and using implants are described in U.S. Pat. No. 3,428,729 and the references contained therein as well as in J. Animal Science, 27, 1772 (1968) or J. Biomed. Mater. Res., 1, 433 (1967).

EXAMPLE 3

2'-Hydroxy-5'-(1-hydroxy-2-isopropylaminoethyl)-methanesulfonanilide hydrochloride (500 ug.) is dissolved in saline solution, filtered through a sterilizing filter and administered subcutaneously or intramuscularly to the growing animal.

Alternatively, solvents commonly used for injectables can be used, such as dimethylformamide, dimethylacetamide or dimethylsulfoxide. Also the comminuted insoluble forms of the crystalline bases or insoluble salts may be suspended in a sterile suspending medium such as an aqueous carboxymethylcellulose suspension, then injected.

The preferred method of this invention comprises the implantation of a veterinary implant such as described hereabove into the immature meat producing animal, especially sheep or cattle, said implant containing a quantity of a β-adrenergic stimulant of the preferred compound of Formula II sufficient to induce polyphagia or forced feeding in the subject animal but nontoxic to the animal. Thereby considerable savings in cost to the grower and an increase in feed efficiency are realized by the use of this invention. Usually only a few, say up to 4–5 implants are used. Preferably a single implant is used. For example, in the most preferable use an immature group of cattle or sheep would be administered an implant containing a β-adrenergic stimulant when entering a feeding pen or lot prior to shipping to market.

We claim:
1. The method of inducing polyphagia in immature, meat producing animals comprising administering orally, by implantation, by intravenous injection or intramuscular injection to said animals an effective but nontoxic quantity of a compound having β-adrenergic stimulant activity having the formula:

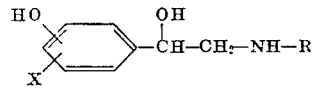

in which:
R is a lower branched or unbranched alkyl of 1–8 carbon atoms, a cycloalkyl of 3–6 carbon atoms or an aralkyl of 7–9 carbon atoms;
X is hydroxy, alkyl of 1–10 carbon atoms, halo, hydroxymethyl, lower alkoxymethyl, sulfamyl, N,N-dimethylsulfamido, ureido, carboxy, acetamido, formamido, amino, ureidomethyl, lower alkylamino, lower alkylsulfonylmethyl, carbomethoxyamino ane carbethoxyamino, said lower alkyl or lower alkoxy groups having 1–8 carbon atoms; said quantity used in oral administration being selected from about 2.5 mg. to about 25 g. of active ingredient per ton of feed and used in implant or injectable administration being selected from about 2.5 μg. to about 25 mg. of active ingredient per day.

2. The method of claim 1 in which the compound has the formula:

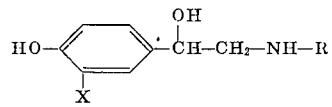

in which:
R is isopropyl or tert.butyl; and
X is hydroxymethyl, methoxymethyl, ureidomethyl, N-methylureidomethyl, N,N-dimethylureidomethyl or methylsulfonylmethyl.

3. The method of claim 1 in which the compound is administered to the animal parenterally.

4. The method of claim 2 in which the compound is administered to the animal in the form of an implant.

5. The method of claim 3 in which the quantity of the compound is from about 2.5 μg. to 25 mg. per day.

6. The method of claim 4 in which the quantity of the compound is from about 25 μg. to about 2.5 mg. per day.

* * * * *